US008886630B2

(12) United States Patent
Pearcy

(10) Patent No.: US 8,886,630 B2
(45) Date of Patent: Nov. 11, 2014

(54) COLLABORATIVE SEARCHING

(75) Inventor: Derek Patton Pearcy, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 68 days.

(21) Appl. No.: 13/340,160

(22) Filed: Dec. 29, 2011

(65) Prior Publication Data
US 2013/0173569 A1 Jul. 4, 2013

(51) Int. Cl.
G06F 17/30 (2006.01)

(52) U.S. Cl.
CPC .................................. G06F 17/30 (2013.01)
USPC ........... 707/713; 707/706; 707/722; 707/736; 707/780; 707/822

(58) Field of Classification Search
CPC ....................................... G06F 17/30
USPC ................................. 707/600–899
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,327,590 | B1 | 12/2001 | Chidlovskii et al. |
| 6,460,050 | B1 | 10/2002 | Pace et al. |
| 7,246,370 | B2 | 7/2007 | Valente et al. |
| 7,451,488 | B2 | 11/2008 | Cooper et al. |
| 7,506,155 | B1 | 3/2009 | Stewart et al. |
| 8,074,256 | B2 | 12/2011 | Valente et al. |
| 2007/0266105 | A1* | 11/2007 | Wu et al. ........................ 709/206 |
| 2008/0109870 | A1 | 5/2008 | Sherlock et al. |
| 2009/0094224 | A1 | 4/2009 | Ricket et al. |
| 2010/0067390 | A1 | 3/2010 | Pereira Valente et al. |
| 2010/0153413 | A1* | 6/2010 | Mok et al. ........................ 707/758 |
| 2010/0257576 | A1 | 10/2010 | Valente et al. |
| 2011/0225622 | A1 | 9/2011 | Pearcy et al. |
| 2011/0276556 | A1 | 11/2011 | Meier et al. |

FOREIGN PATENT DOCUMENTS

| KR | 10-0895405 B1 | 5/2009 |
| WO | WO 2013/101382 A1 | 7/2013 |

OTHER PUBLICATIONS

International Search Report and Written Opinion mailed Mar. 8, 2013 for International Application No. PCT/US2012/066897.
Information Technology Risk Management, Copyright 2002, © Glen B. Alleman, Niwor, Colorado, 22 pages.
International Preliminary Report on Patentability in International Application No. PCT/US2012/066897, mailed Jul. 1, 2014, 7 pages.

* cited by examiner

Primary Examiner — Isaac M Woo
(74) Attorney, Agent, or Firm — Patent Capital Group

(57) ABSTRACT

A collaborative search session is provided hosted by one or more computing devices. First query data is received from a first computing device in a collaborative search session. Further, second query data is received from a second computing device in the collaborative search session. A corpus of resources can be caused to be searched based at least in part on the first and second query data to identify a particular search result set for the collaborative search session. At least a portion of the particular search result set can be caused to be presented on each of the first and second computing devices participating in the collaborative search session.

25 Claims, 11 Drawing Sheets

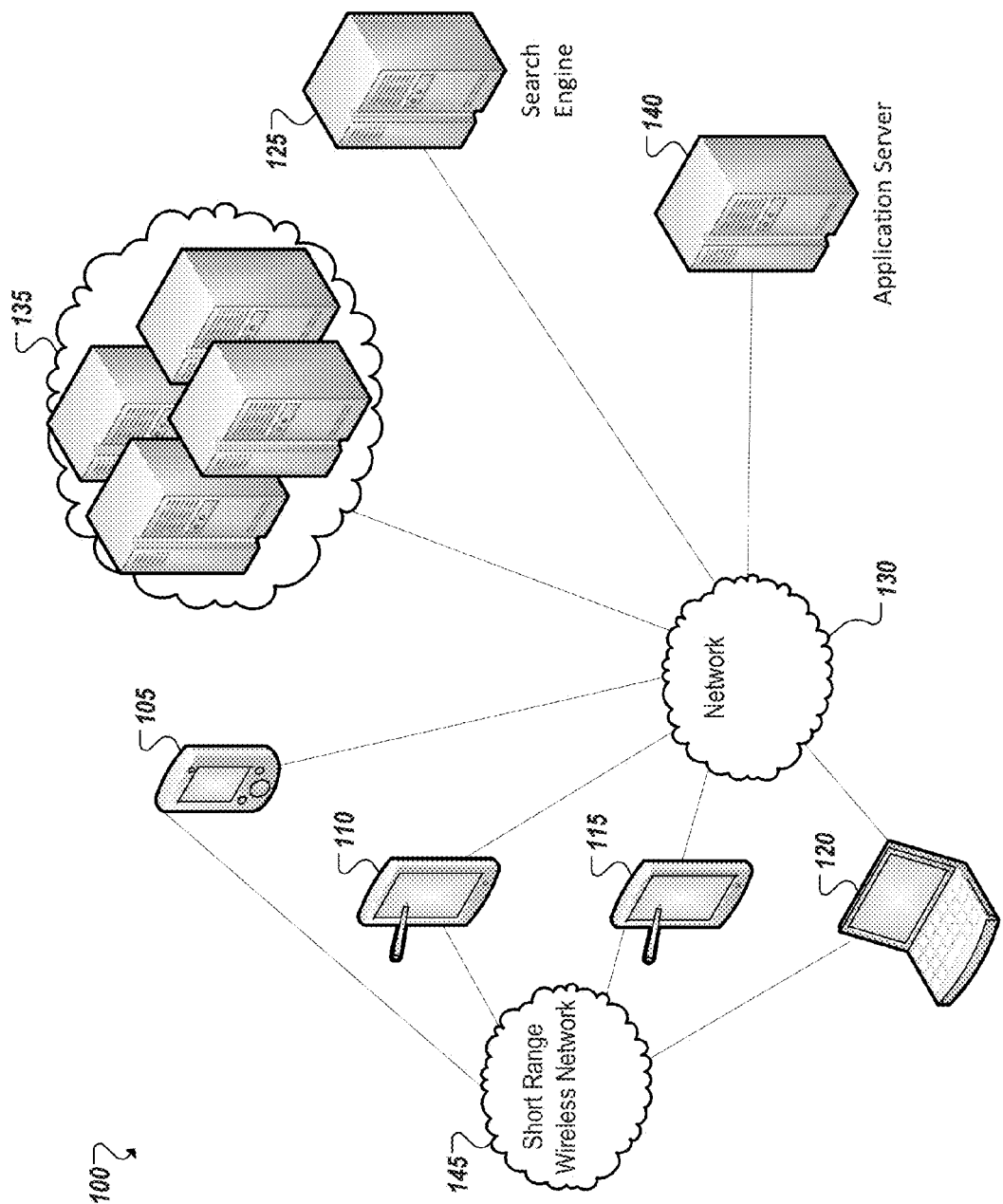

COLLABORATIVE SEARCHING

TECHNICAL FIELD

This disclosure relates in general to the field of searching digital resources and, more particularly, to multiuser searching.

BACKGROUND

Search engines generally attempt to provide users with fast, accurate, and timely search results. Several search engines exist with varying interfaces and algorithms that assist computer users in finding resources stored on one or more computing systems, including a network of computing systems. With the advent of the Internet, search engines have grown in speed and functionality, to accommodate demand for finding the billions of resources stored in computing systems connected across the Internet. Web search engines, for instance, are search engines designed to search for information on the Internet. Typically, a user submits a search query specifying certain keywords, criteria, or conditions and the search engine consults one or more indexes to determine which resources, known to the search engine, likely satisfy the search query. Results of the search, also known as "hits," can be returned to the user. In some cases, the user can access or request the resources included in a listing of hits directly from the listing, for instance, through the selection of a corresponding hyperlink.

In some existing search engines, multiple different users independently submit search queries and interact with search results generated in response to the queries. Users' queries and interactions with the search results can be collected and stored as histories and can be associated with particular users or categories of users. Some modern search engines attempt to take an individual user's history or profile into account when returning results of a given search query. For instance, a geographic location associated with the user can be employed to return, if possible, search results that accord with that location. Historical trends observed for a given user can also be considered in a search algorithm as well as the aggregate historical trends of multiple independent users to assist in generating search result sets more responsive to particular queries. For instance, in some modern search engines, intelligence gleaned from previous searches performed by one or more users can be used to influence both the search criteria recommended and the search results returned for another user in a subsequent search.

BRIEF DESCRIPTION OF THE DRAWINGS

FIG. 1 is a simplified schematic diagram of an example computing system adapted to enable collaborative searching in accordance with one embodiment;

Like reference numbers and designations in the various drawings indicate like elements.

DETAILED DESCRIPTION OF EXAMPLE EMBODIMENTS

Overview

Figure 2A:
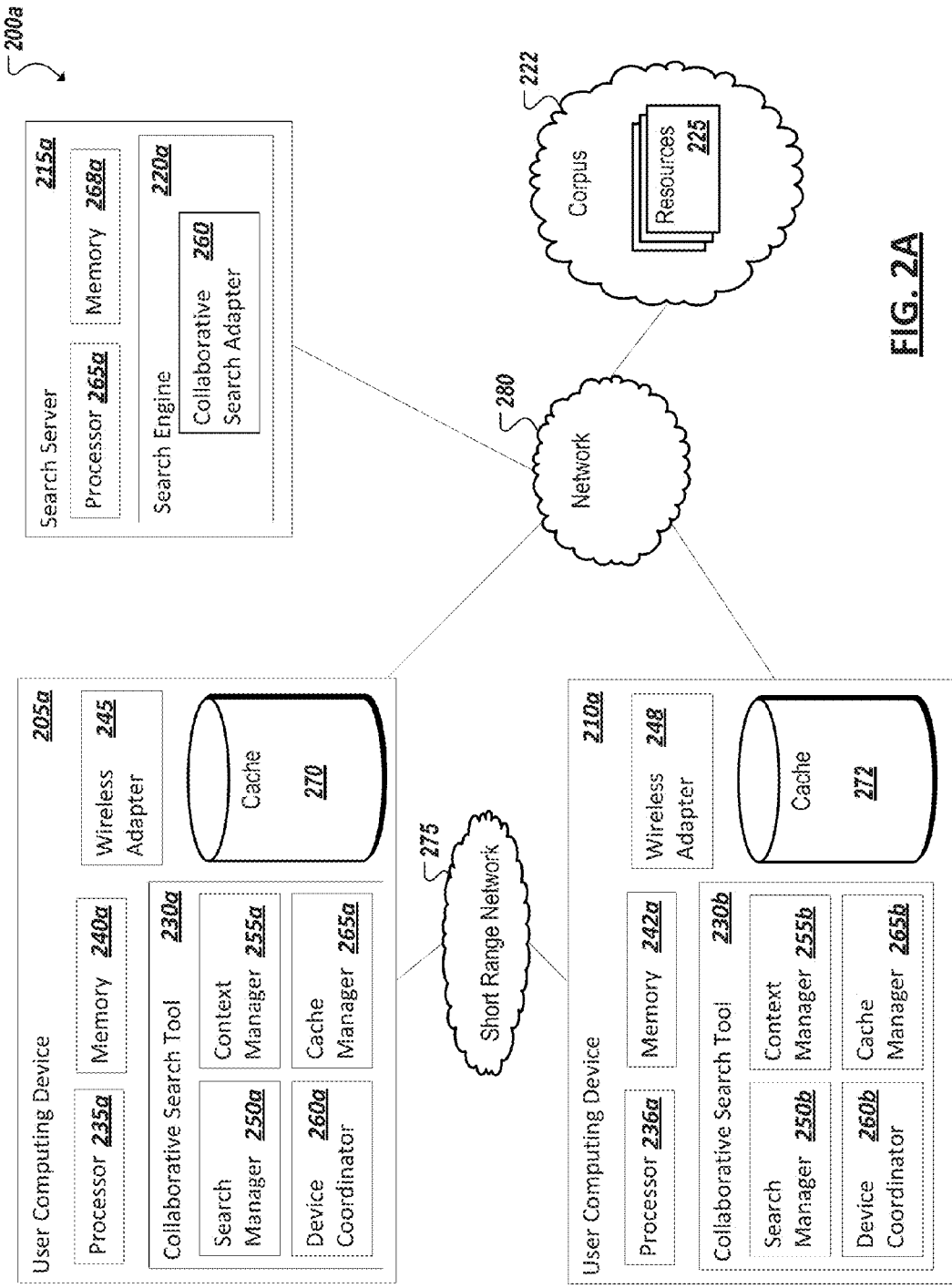
FIG. 2A is a simplified block diagram of a first example system including two or more computing devices and at least one search engine in accordance with one embodiment.

In general, one aspect of the subject matter described in this specification can be embodied in methods that include the actions of receiving first query data from a first computing device in a collaborative search session and receiving second query data from a second computing device in the collaborative search session. A corpus of resources can be caused to be searched based at least in part on the first and second query data to identify a particular search result set. At least a portion of the particular search result set can be caused to be presented on each of the first and second computing devices.

Further, in another general aspect, a system can be provided including at least one processor device, at least one memory element, and a collaborative search tool. The collaborative search tool, when executed by the processor, can receive first query data from a first computing device and second query data from a second computing device in a collaborative search session. The collaborative search tool can cause a corpus of resources to be searched using the first and second query data to identify a particular search result set and cause at least a portion of the particular search result set to be presented on each of the first and second computing devices. In some instances, the system can further include a search engine adapted to search the corpus of resources to identify resources satisfying particular search queries.

These and other embodiments can each optionally include one or more of the following features. Aggregate query data can be developed from the first and second query data. Receipt of the first query data can causes a first search result set to be identified based at least in part on the first query data and receipt of the second query data can cause the first search result set to be modified based on the second query data to form the particular search result set. The first query data can include a search query and the first search result set can be an initial search result set responsive to the search query and second query data can include a request to filter the first search result set according to a first criteria. The first query data can include a request to apply a first filter to a predetermined search result set to form the first search result set and second query data includes a request to apply a second filter to the first search result set to form the particular search result set. The particular search result set can be an initial search result set within the collaborative search session. The first query data is different from the second query data. The collaborative search session by associating the first and second computing devices with the particular collaborative search session. Establishing a collaborative search session can further include sending an invitation to join the collaborative search session to at least the second computing device, and identifying that the second computing device has joined the collaborative search session. Establishing the collaborative search session can further include identifying that the first and second computing devices have joined the collaborative search session.

Further, embodiments can each optionally include one or more of the following features. The particular search result set can be presented according to a first search context on the first computing device and according to a different, second search context on the second computing device. Each of the first and second search contexts can be selected by users at the respective first and second computing devices respectively. At least one user input at the first computing device can assign the second search context to the second computing device. Additional query data can be received from a device participating in the collaborative search session and the particular search result set revised based on the additional query data. A presentation on the first computing device applying the first search context can be modified in accordance with the revision of the particular search result set as well as the presentation on the second computing device applying the second search context. The modification of the presentation on the first computing device applying the first search context can be different from the modification of the presentation on the second computing device applying the second search context. The collaborative search session can be closed by at least one of saving the collaborative search session and tearing down the collaborative search session. The collaborative search session can be hosted, at least in part, by the first computing device and/or a remote search server. Query data can include at least one of a search query, additional search query term, a filter to be applied to a set of search results, inputs from a query branching by one of the participating devices in the collaborative search session, a request to sort a set of search results, an interaction with a presentation of a set of search results, and feedback data relating to one or more results returned in a set of search results.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a plurality of computing devices 105, 110, 115, 120 each capable of accessing and utilizing a search engine, such as a search engine server 125 provided by a particular remote search engine server or another computing device (e.g., 105, 110, 115, 120) hosting a search engine. In instances where the search engine is hosted by a remote computing device or server, computing devices (e.g., 105, 110, 115, 120) can submit queries, receive search results, and otherwise communicate and utilize the search engine via one or more networks (e.g., 130, 145), including public networks such as the Internet as well as private networks, such as local area networks (LANs) or wireless LANs (WiLANs). Search engine (e.g., 125) can include logic for indexing and searching a plurality of digital resources, including web pages, digital documents, digital images, digital audio and/or video, and other files and data including, in some examples, data hosted by one or more remote servers 135. In some instances, a search engine can interface with programs hosted locally at one of the computing devices 105, 110, 115, 120 or remotely by one or more application servers (e.g., 140) to provide search functionality for the application or other programs. In some examples, the data being indexed by the search engine may be generated, cached for some period of time, and subsequently archived either locally or remotely, or in some combination.

In system 100, two or more of computing devices 105, 110, 115, 120 can engage in a collaborative search session, allowing users of multiple computing devices to concurrently interact with a search engine 125 to collaboratively develop a refined search result set based on search queries and other inputs (collectively "search query data") received by users of the devices participating in the collaborative search session. A collaborative search session can permit multiple users, such as in a business or educational setting, to perform joint research or analysis using one or more search engines. Multiple, concurrent, collaborative search sessions can be supported using search engine 125. Further, collaborative search sessions can allow the collaborating users (e.g., of computing devices 105, 110, 115, 120) to "branch" a particular search or search query, allowing each of the collaborating users to adjust one or more criteria of the search query in order to explore different result sets in parallel before subsequently sharing both their results and their modified search terms with the other collaborating device. Further, these branched searches remain linked to the parent search from which the explorations were branched during the collaborative search session.

Logic facilitating a collaborative search session can be provided using one or more of the computing devices (e.g., 105, 110, 115, 120) participating in the collaborative search session and/or the search engine itself (as illustrated and explained in more detail in connection with FIGS. 2A and 2B). In some instances, devices (e.g., 105, 110, 115, 120) can participate and communicate within a collaborative search session using one or more networks, including network 130 as well as short-range networks 145, such as a Bluetooth- or WiFi-based network, allowing substantially collocated devices to recognize and communicate with one another within a collaborative search session.

In general, "servers," "clients," and "computing devices," including computing devices used to implement system 100 (e.g., 105, 110, 115, 120, 125, 135, 140, etc.), can include electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, and computing devices (e.g., 105, 110, 115, 120, 125, 135, 140) can each include one or more processors, computer-readable memory, and one or more interfaces, among other features and hardware. Servers can include any suitable software component or module, or computing device(s) capable of hosting and/or serving a software application or services (e.g., services of application server 140 or host servers 135), including distributed, enterprise, or cloud-based software applications, data, and services. For instance, servers can be configured to host, serve, or otherwise manage data sets, or applications interfacing, coordinating with, or dependent on or used by other services, including analytics-focused applications and software tools. In some instances, a server, system, subsystem, or computing device can be implemented as some combination of devices that can be hosted on a common computing system, server, server pool, or cloud computing environment and share computing resources, including shared memory, processors, and interfaces.

Computing devices 105, 110, 115, 120 can include traditional and mobile computing devices, including personal computers, laptop computers, tablet computers, smartphones, personal digital assistants, feature phones, handheld video game consoles, desktop computers, internet-enabled televisions, and other devices capable of utilizing a search engine 125 and communicating with other devices over one or more networks (e.g., 130, 145). Attributes of mobile computing devices 105, 110, 115, 120 can differ widely from device to device, including the operating systems and collection of software programs loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 105, 110, 115, 120). All or a portion of search engine 125 can also be installed locally on one or more of computing devices 105, 110, 115, 120. Other device attributes can also include peripheral devices connected or otherwise accessible to the device, and the types of network technology for which the device is adapted.

Computing devices (e.g., 105, 110, 115, 120) can further include at least one graphical display device and user interfaces allowing a user to view and interact with graphical user interfaces of applications and other programs provided in system 100, including search engine user interfaces and graphical representations of search results returned by a search engine. In general, user computing devices can include any electronic computing device operable to receive, transmit, process, and store any appropriate data associated with the software environment of FIG. 1. Moreover, while user computing devices (e.g., 105, 110, 115, 120) may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2B:
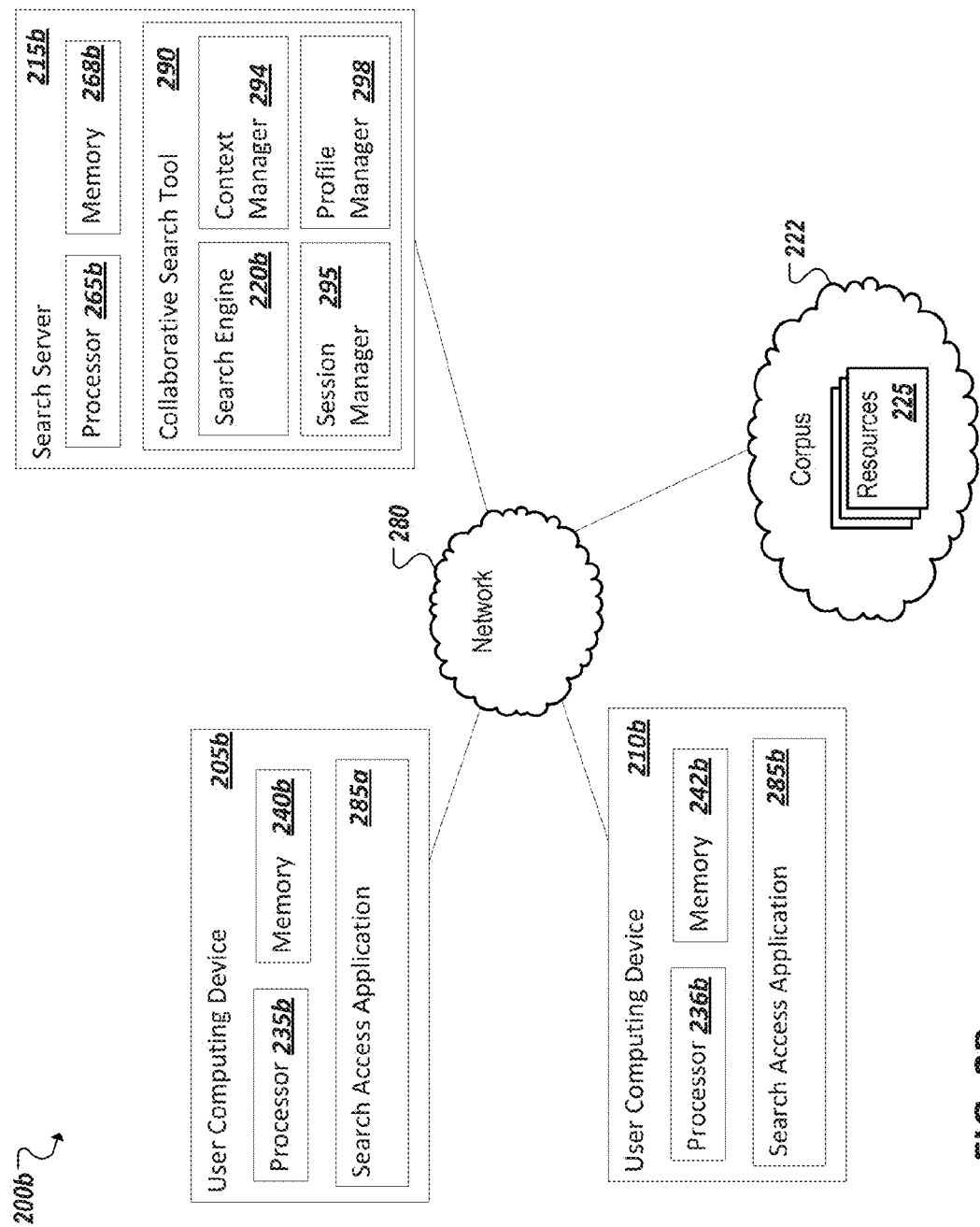
FIG. 2B is a simplified block diagram of a second example system including two or more computing devices and at least one search engine in accordance with one embodiment.

Turning to FIGS. 2A-2B, simplified block diagrams are shown of example systems capable of facilitating a collaborative search session. In a first example system 200a, two or more user computing devices 205a, 210a are provided together with a search server 215a hosting a search engine 220a adapted to search a corpus 222 of digital resources 225. One or both of user computing devices 205a, 210a can include a collaborative search tool 230a, 230b adapted to enable computing devices 205a, 210a (and their users) to participate in a collaborative search of corpus 222. Further, user computing devices 205a, 210a can include one or more computer processors 235a, 236a and one or more memory elements 240a, 242a for use in executing computer-readable instructions and logic to implement one or more functions of the respective user computing devices 205a, 210a.

An example collaborative search tool 230a, 230b can include one or more modules or tools including a search manager 250a, 250b, context manager 255a, 255b, device coordinator 260a, 260b, cache manager 265a, 265b, among other examples. A search manager 250a, 250b can include functionality for interfacing with and communicating with a search engine 220a utilized in the collaborative search. In some implementations, search manager 250a, 250b can alternatively use a search engine locally hosted in whole or in part at the user computing device (e.g., 205a, 210a). Search manager 250a, 250b can coordinate the sending of search queries and other query data (such as the selection of search filters, sorting of search results, feedback data regarding certain search results (e.g., indicating that certain search results correspond best to the users' desired search), or other interactions with a search result set returned by the search engine (e.g., 220a)) as well as the delivery of search results from the search engine. Requests, queries, and other communications between a particular user computing device 205a, 210a and the search engine (e.g., 220a) within a collaborative search session can be facilitated or otherwise managed by search manager 250a, 250b.

An example collaborative search tool 230a, 230b can further include a context manager 255a, 255b. Modern search engines can permit search results to be returned and displayed in a variety of forms and using a variety of organizational techniques, presentation algorithms, and user interface designs (collectively "contexts"). For example, modern search engines can provide search results in a first context as a traditional listing of results such as a listing including summaries of the digital resources returned in the search, links to the respective search results, etc., as well as other contexts. For instance, search results can be presented in other contexts such as an interactive geographical map overlaid with some of the returned search results (e.g., using flags or other indicators associating addresses or locations on the displayed map with some of the search results and permitting interactions such as zooming in and out of a map view, panning the map, etc.), a listing of videos matching the query (e.g., allowing further sorting or filtering of the videos according to terms or characteristics relevant to videos), a listing of digital images satisfying the query (e.g., allowing further sorting or filtering of the videos according to terms or characteristics relevant to videos), categorized searches (e.g., grouping search results by identified categories, etc.), person-centric searches (e.g., search results sorted according to persons identified within or related to the search results), search results including screenshots or other previews of the digital resources included in the results, search results displayed in non-traditional infographics or other formats, such as mind maps and other graphical representations of search results.

In some instances, it can be desirable for different users in a collaborative search session to each view a returned set of search results in different available contexts. Further, some contexts can be identified that are complimentary to others and individual devices in a collaborative search session can be automatically assigned particular search contexts during a particular collaborative search session. Further, in some implementations, one of the participating computing devices (or users) in a collaborative search session can be designated as a leader of the session and can specify the search contexts presented and used on other computing devices participating in a given collaborative search session. Accordingly, context managers 255a, 255b can be used to identify and coordinate available search contexts used and for use within a particular collaborative search session. Further, context managers 255a, 255b can be used in connection with search manager 250a, 250b to provide for context-specific data to be delivered to corresponding computing devices 205a, 210a according to the context employed to view and interact with search results on the device, among other uses and examples.

Additional modules can also be provided in connection with a particular example implementation of collaborative search tool 230a, 230b. For instance, a device coordinator 260a, 260b can be provided to coordinate which users (i.e., which other computing devices) are invited or otherwise authorized to join and participate in a given collaborative search session, as well as control the permissions granted to each device, for instance, by a designated lead device within a collaborative search session. In some instances, the leader (or lead user) of a session can be the user of the device that original created or initiated a particular collaborative search session. The lead device can control the settings and access privileges and permissions of the session, including deleting components of a collaboration down to its entirety. For instance, some devices in a particular collaborative search session can be restricted to the types of contexts that can be used, the timing, frequency, and types of query data that can be contributed and submitted by particular devices, etc. during a collaborative search session, in an effort to direct the progress and goals of the session. In other instances, device coordinator 260a, 260b can also be used to negotiate how computing devices within the session join, communicate, and interact within a session. For instance, device coordinator 260a, 260b can be used to specify a network (e.g., 275, 280) over which the collaborative search session is to be implemented, credentials, role definitions, group membership, and invitations used to control users' access to the collaborative search session, as well as the particular search engine(s) (e.g., 220a) to be used and the corpuses (e.g., 222) to be searched within the collaborative search session. For example, in some instances, one or more of the computing devices participating in a particular collaborative search session can provide or host the search engine used within the collaborative search session, or at least serve as a central cache for search results provided for an initial search query by, for instance, an outside search server 215a. In such instances, search logic and a set of corresponding available search contexts can be provided through a search engine hosted local to one of the collaborating computing devices. In such instances, a cache manager 265a, 265b can be used to manage a cache (e.g., 270, 272) or other data structure managing and at least temporarily storing search results acted upon and interacted with by users of computing devices participating within a particular interactive collaborative search session. For instance, interactions by particular participating computing devices can serve to filter, sort, or narrow a set of cached or otherwise returned search results, and a cache manager of one or more of the participating computing devices can centrally manage how interactions within the collaborative search session affect a set of search results refined within the session.

Search engines (e.g., 220a) can be provided either local to or remote from computing devices participating in a collaborative search session. An example search engine server (e.g., 215a) can include one or more processor devices (e.g., 265a) and one or more memory elements (e.g., 268a) along with search logic embodying one or more search algorithms that can be applied against an index or catalog of know digital resources enabling the search engine to "search" the digital resources (i.e., through the index or catalog). In some instances, a search engine can include the index itself and can include further logic to build, update, and maintain the index. For instance, in some example search engines, a crawler or other tool can be provided that is adapted to automatically (or manually (e.g., through user inputs)) build a search index or catalog by identifying resources within the corpus. In other instances, a search engine can search a static index or may access and be applied against search indexes constructed, provided, or maintained by entities, tools, or components outside the search engine. For instance, in one example, a lead computing device participating in a collaborative search session can include a search engine capable of searching a portion of a corpus of digital records, an outside index, or a portion of an index representing an initial set of search results returned by another, outside search engine (e.g., 220a) or another source. In such an example, a search engine 220a could perform an initial search and provide a corresponding set of search results while a search engine provided at one of the collaborating user devices (e.g., 205a) could, in essence, search and refine the set of search results (e.g., according to inputs received by a plurality of computing devices participating in a collaborative search session). In some instances, a collaborative search adapter 260 can also be provided in connection with a search engine (e.g., 220a) to assist in facilitating cooperation with computing devices participating in a collaborative search session. For instance, a collaborative search adapter 260 can be used to track a collaborative search session and recognize when received query data pertains to a collaborative search. Further, collaborative search adapter 260 can be used to tailor the search engine's 220a responses and search processes based on the recognition that responses, search results, contexts, and processes support a collaborative search session.

While in the example of FIG. 2A, computing devices 205a, 210a are provided with collaborative search tools 230a, 230b driving a collaborative search session involving the computing devices (e.g., 205a, 210a), in other instances, an outside computing device (i.e., a device whose users are not participating directly in the collaborative search session), such as a remote search server, can provide the functionality and logic for establishing and providing collaborative search sessions for multiple user computing devices. For instance, turning to FIG. 2B, a system 200b can be provided that includes a search server 215b with a collaborative search tool 290. Search server 215b can further include one or more processor devices (e.g., 265b) as well as one or more memory elements (e.g., 268b) for use in executing machine-readable instructions and logic corresponding to collaborative search tool 290 and other software and programs accessible to search server 215b. Collaborative search tool 290 can host and provide functionality for multiple collaborative search sessions involving potentially limitless numbers of different combinations of client computing devices consuming the collaborative search session, such as user computing devices 205b, 210b. User computing devices 205b, 210b can include processors (e.g., 235b, 236b) and memory (e.g., 240b, 242b) and software, such as search access applications (e.g., 285a, 285b) adapted to interface with outside search engine servers (e.g., 215b), accept user inputs and query data, including search terms and queries, inputs evidencing user interactions with a set of search results, and other inputs and communicate such user inputs to collaborative search tool 290 (e.g., over one or more network interfaces of computing devices 205b, 210b and one or more networks (e.g., 280). Search access applications 285a, 285b can include web browsers (e.g., for accessing and interacting with a web-based collaborative search tool 290) or other programs that can provide a graphical user interface (GUI)

presenting search results to a user within a collaborative search session, accept user inputs evidencing a user's response to or interactions with a presented set of search results within a collaborative search session, and communicate with a remote search engine.

In some examples, collaborative search tool 290 can include a search engine 220b, context manager 294, session manager 295, profile manager 298, among other potential tools, modules, and components for use in establishing and supporting a collaborative search session. Search engine 220b can function similar to other search engines and provide search logic (and in some cases search index building functionality) to support and enable the searching of a corpus 222 of resources 225 (such as a set of know websites or other digital resources on a network (e.g., 280), including, in some examples, digital resources available on the Internet). The search engine 220b can respond to received search queries (i.e., from user computing devices, including those participating in collaborative search sessions) and return search results, as well as updated search results, in response to such queries.

Collaborative search tool 290 can support the delivery of search results for presentation within a variety of different search contexts. For instance, context manager 294 can be used to tailor search result data for presentation within particular search contexts on user computing devices 205b, 210b. Further, collaborative search tool 290 can track which computing devices 205b, 210b, within a given collaborative search session utilize which available search contexts and tailor responses and inputs received from participating user computing devices 205b, 210b to the respective search context utilized at the corresponding user computing devices 205b, 210b. In some instances, a session manager 295 can be used to assist in tracking the characteristics of and participants within a particular collaborative search session. For example, session manager 295 can be used to organize and maintain a collaborative search session that includes particular participating user computing devices utilizing particular search contexts and maintain records tracking these session characteristics. Session manager 295 can also be used to track which query data belong to which collaborative search session, as some implementations of collaborative search tool 290 can host multiple, concurrent collaborative search session involving a plurality of different users. Further, in some implementations, search server 215b can host collaborative as well as traditional, independent search sessions (i.e., involving a single independent client), and session manager 295 can be used to differentiate between independent and collaborative search sessions. At the close of a collaborative search session, session manager 295 can close the collaborative session by tearing-down the collaborative session or alternatively saving the session to be resumed later. In some examples, the search request history both for individual users and for specific collaborations and branches of collaborations can all be stored and utilized in the resuming of previous search sessions or initiating of new sessions. In some instances, characteristics of collaborative search sessions hosted by collaborative search tool 290 can be tailored to user preferences or user-provided instructions for the collaborative search session. In some instances, a profile manager 298 can be provided to recognize particular users (of participating computing devices (e.g., 205b, 210b)) and associated user profile information corresponding to the users, for instance, to apply identified preferences of particular users (e.g., preferred search context, user geographic or demographic information, etc.) to collaborative search sessions involving the user.

Figure 3A:
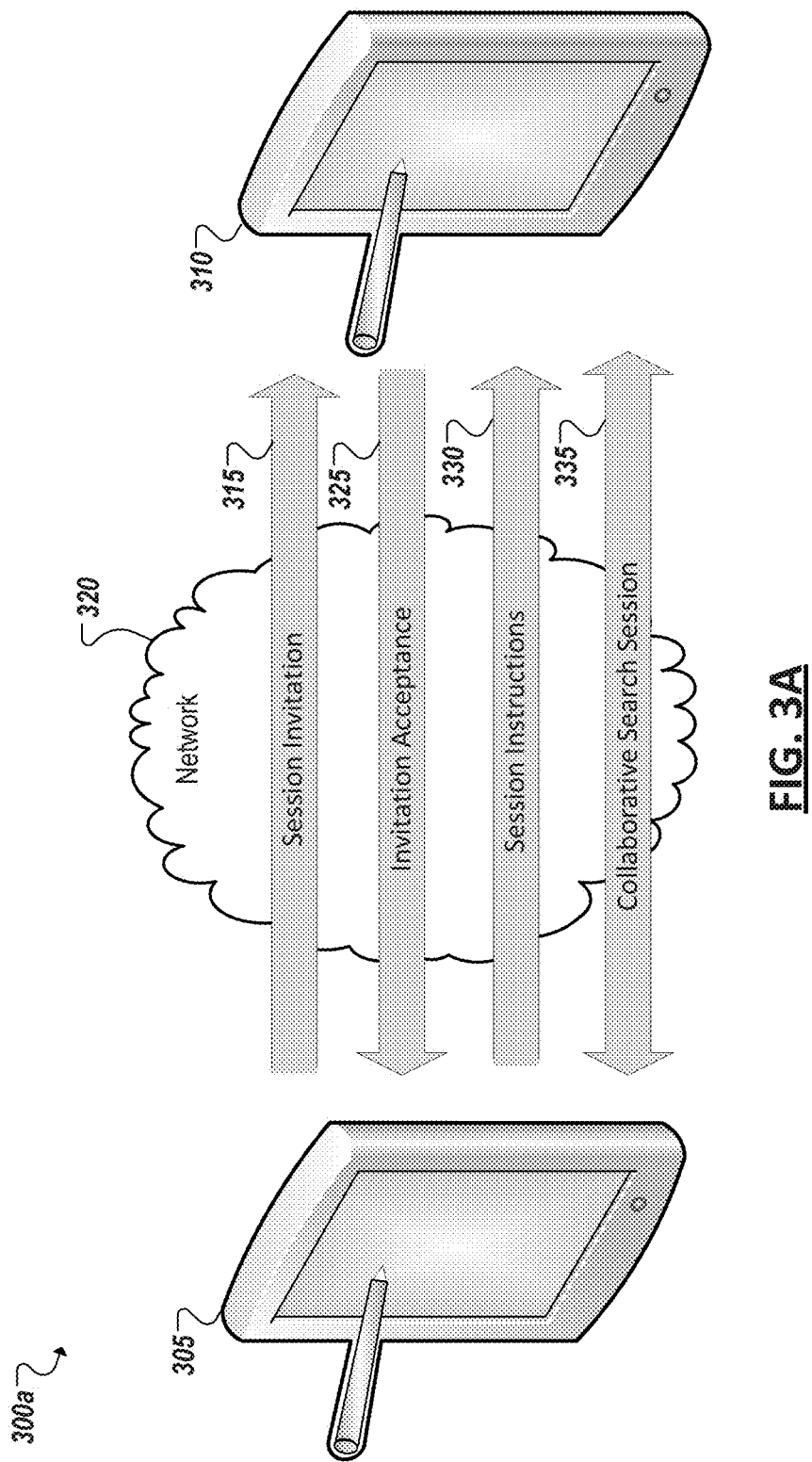
FIGS. 3A-3B are simplified block diagrams illustrating example techniques for establishing a collaborative search session in accordance with at least some embodiments.
Figure 3B:
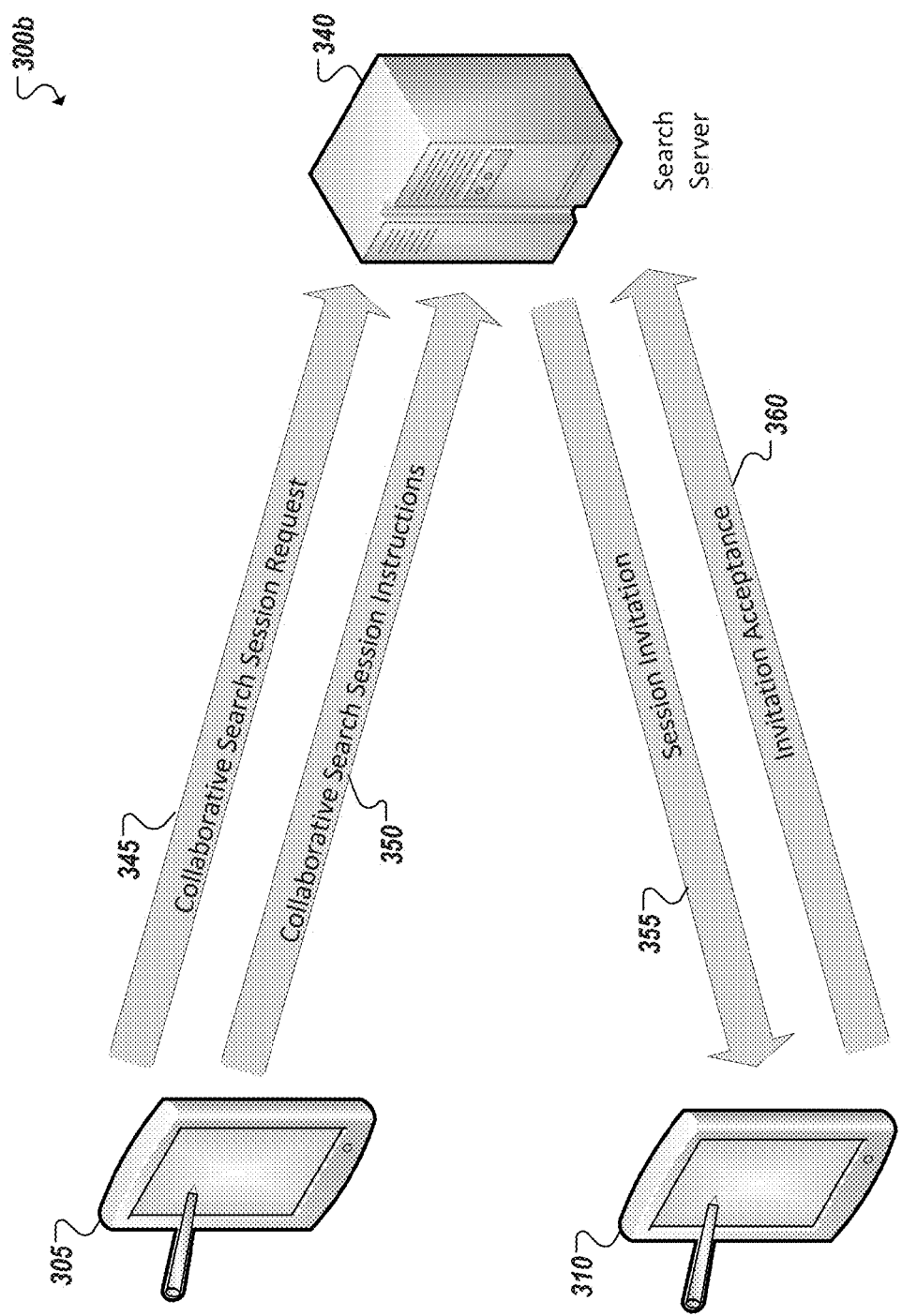

Turning to FIGS. 3A-3B, in some instances, establishing or launching a collaborative search session can involve identifying participating user computing devices and setting particular attributes of the collaborative search session. In a first example, illustrated by the simplified block diagram 300a of FIG. 3A, a collaborative search session is managed, or served, by one of the other participating user computing devices 305, 310 (for instance, according to a system configuration similar to that shown and described in FIG. 2A). A user of a lead computing device 305 (e.g., a computing device hosting the collaborative search session) can invite 315 one or more other computing devices (and their users) to participate in a collaborative search session, sending the invitation over one or more networks 320. In some instances, a short range network, such as a Bluetooth piconet, can be used to identify other computing devices (e.g., 310) within range of the hosting device 305 as candidates for a particular collaborative search session and connect to and communicate with the other devices in connection with setting-up and participating in a collaborative search session, independent from or in concert with any device's other network access channels. In other instances, computing devices participating in a collaborative search session can communicate and participate over other networks, including private LANs of a company, university, or other entity, or using virtual LANs (VLANs) or other connections over a public network such as the Internet.

Invitations to or requests to join an advertised or private collaborative search session can take many forms. For instance, an email or SMS message can be sent with a link, sign-in information (e.g., passwords, session IDs, etc.), or other information about the timing and nature of the collaborative search session as well as instructions for joining the collaborative search session. If an invited user wishes to join the collaborative search session, a response 325 can be sent to the hosting computing device 305. Session attributes and instructions 330 can be negotiated or otherwise communicated between the participating computing devices in the collaborative search session to set permissions, respective search contexts, search engine rules, the corpus to be searched, and other attributes guiding the realization of the users' goals and expectations for the collaborative search session. With the participating members and collaborative search session attributes in place, the collaborative search session (335) can begin, with data communicated between the participating devices 305, 310 identifying collaborative search queries and interactions with search results returned in the collaborative search session.

In another example, a search server can host a collaborative search session for participants of the collaborative search session (for instance, according to a system configuration adopting principles similar to that shown and described in FIG. 2B). For example, as illustrated in the simplified block diagram 300b of FIG. 3B, one or more user computing devices (e.g., 305) can request 345 to launch or resume a collaborative search session hosted by search server 340. Instructions and collaborative search session attributes (such as the search contexts, search tools to be enabled, indexes to be searched, and other participants to include or invite) can also be communicated and specified (at 350) by one or more users (e.g., at 305). In some instances, the request to launch a collaborative search session can itself include specified or requested session attributes. The search server 340 can process the request to launch the collaborative search session and build a session that incorporates the requested session attributes. Further, search server 340 can identify other users (and associated computing devices (e.g., 310)) and coordinate the participation of these users in the collaborative search session. For instance, session invitations can be sent (at 355) to other computing devices identified as associated with other participants in the collaborative search session. Upon coordinating the other participants' participation in the collaborative search session, for instance, through the receipt of invitation acceptance messages (e.g., 360), search server 340 can initiate the collaborative search session.

In some instances, participants in a collaborative search session can be added or drop-out of a live collaborative search session. For instance, new invitations can be sent to add additional participants during the collaborative search session and invitations can be accepted and participants added during the session. Further, when particular participants leave a particular collaborative search session, it may be the case that only a single user is left in the session. In such instances, the remaining user can elect to translate the collaborative search session into a traditional search session involving only a single user (e.g., to the extent that such privatization is in keeping with any controls or rules original set for the session, for instance, by the session's initiator, host, lead user, etc.). In other instances, the remaining user can preserve the settings of the collaborative search session to allow for collaborative searching to resume as soon as at least one other participant joins the search session. Further, a user can launch a collaborative search session from a traditional search session involving only the single user, without first advertising its existence to potential collaborators. For instance, a set of search results can be generated from a first user's interactions with and queries of a search engine and a collaborative search session can be launched to further refine, analyze, filter, sort, interact with, and further process the original set of search results returned in the original search session. Further, both single and multi-user collaborative search sessions can provide functionality for branching one or more search queries within the search session.

Figure 4:
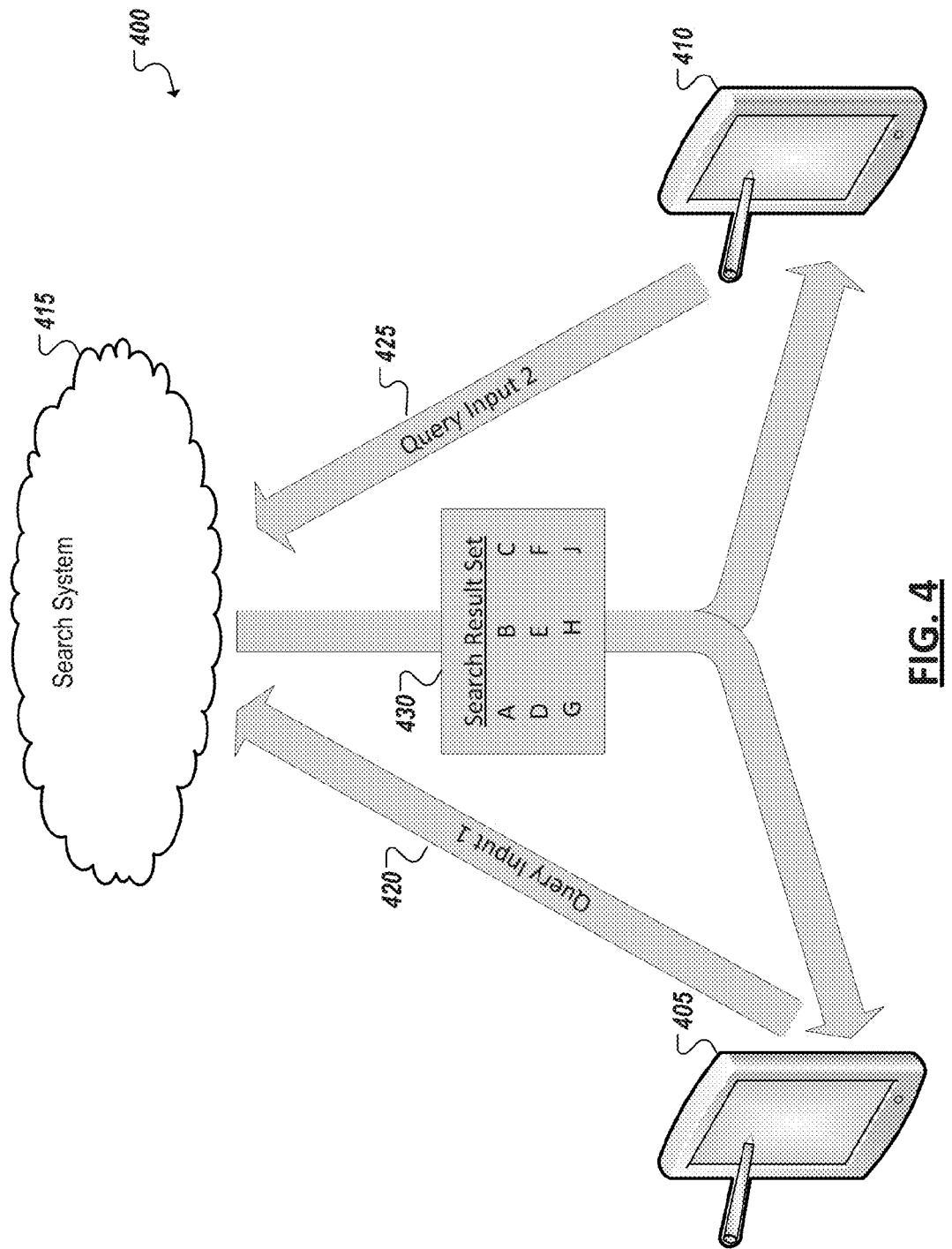
FIG. 4 is a simplified block diagram illustrating example tasks in an example collaborative search in accordance with at least some embodiments.

In other instances, an initial set of search results can be returned in response to complex criteria, multiple queries, or other query data, such as data indicating the selection of a particular search filter (e.g., filtering returned search results according to one or more different criteria), database or index, search context, search engine graphical user interface element, etc. For instance, as shown in the example of FIG. 4, a simplified block diagram 400 is shown including two or more user computing devices 405, 410 submitting query inputs 420, 425 to a particular search system, including search systems hosted remote from or local to the participating computing device 405, 410 in whole or in part. Search system 415, including at least one search engine, can receive and consider each of the query inputs 420, 425 in generating a responsive set of search results 430. The search results 430 can be sent to and presented on each of the participating computing devices 405, 410, allowing for further refinements and interactions with the search results 430 by the collaborative search session participants. In some instances, different participating computing devices 405, 410 can adopt different search contexts within the collaborative search session. Accordingly, while search results 430 are communicated and presented on each of the participating computing devices 405, 410, the respective presentations can be different in that they present the search results according to the different, respective search contexts active on the participating computing devices. This can permit the same set of search results 430 to be viewed and analyzed from different viewpoints, according to different organizational techniques, etc., allowing the search results to be considered and analyzed concurrently according to a plurality of different angles, to say nothing of the benefits of analyzing the results using a plurality of different users with their own abilities, biases, and evaluation techniques.

Search system 415 can consider query inputs 420, 425 serially, in aggregate, or using a combination of both techniques. Further, query inputs 420, 425 can be considered in parallel (e.g., in a branching of a query within the session) to allow individual collaborating users to assess the effects and significance of the inputs before sharing or incorporating the results or effects in the remaining collaborative search session. Results or effects generated in response to the inputs can be shared with or incorporated in the common search data used by the collaborating users as well as the respective GUIs presented on the collaborating devices. For example, branching of an initial (or earlier) query can result in one of the participating devices experimenting with various alternative query terms, filters, etc. and exploring the results of the branching. The participating user, upon identifying terms or filters, or criteria of value to the collaborative use group, can elect to formalize, enter, or share inputs, filters, query refinements, and other inputs entered within the query branching with the collaborative search session to affect the results of the collaborative search session.

In one example, a search system can perform a search of a corpus of digital resources according to a first-received input (e.g., 420) and generate a first set of search results that can be further narrowed, broadened, filtered, re-organized, or otherwise modified according to the second-received input (e.g., 425) to generate a serially-refined set of search results. Considering query inputs serially can, in essence, allow subsequently-received query inputs to refine results generated based on earlier-received query inputs. Alternatively, first- and second-received query inputs can be considered jointly, for instance, by building a single search query or other search-related instruction that aggregates the information communicated in each of the multiple query inputs 420, 425 received from multiple participating computing devices. The set of search results would then be generated based on the aggregate search query or instruction crafted from multiple query inputs 420, 425. For instance, aggregating query inputs can include applying search criteria and terms in the alternative ("OR") or inclusively ("AND"), as well as identifying commonalities and inconsistencies in the respective aggregate query inputs to arrive at a query, filter, or other search operation that embodies, at least in part, each of the aggregated query inputs.

A search engine can employ both serial and joint consideration of query inputs within a single collaborative search session. In some instances, users of the collaborative search session can specify whether inputs should be considered jointly or serially. For instance, one or more of the users of the collaborative search session, such as a lead user in the session, can indicate when or specifically request that a search engine should process user inputs received in the session. In some instances, one of the computing devices (e.g., a designated lead device) participating in the collaborative search session can collect query data input by users within the collaborative search session. At particular moments, the lead device can allow one, two or more, or some combination of query data inputs to be used by a search engine to refine a set of search results or generate new search results. For instance, a user can designate that multiple query inputs be considered in the aggregate in some instances, and designate that other query inputs be considered serially in other instances. Further, in some implementations, search results can be generated by considering multiple query inputs both serially and in the aggregate. In some instances, processing a set of multiple query inputs serially or in aggregate can directly impact the result set that is generated or returned. In some implementations, multiple query inputs can be processed both serially and in aggregate to develop a single set of search results that incorporate the results of processing the query inputs using both techniques.

Figure 5A:
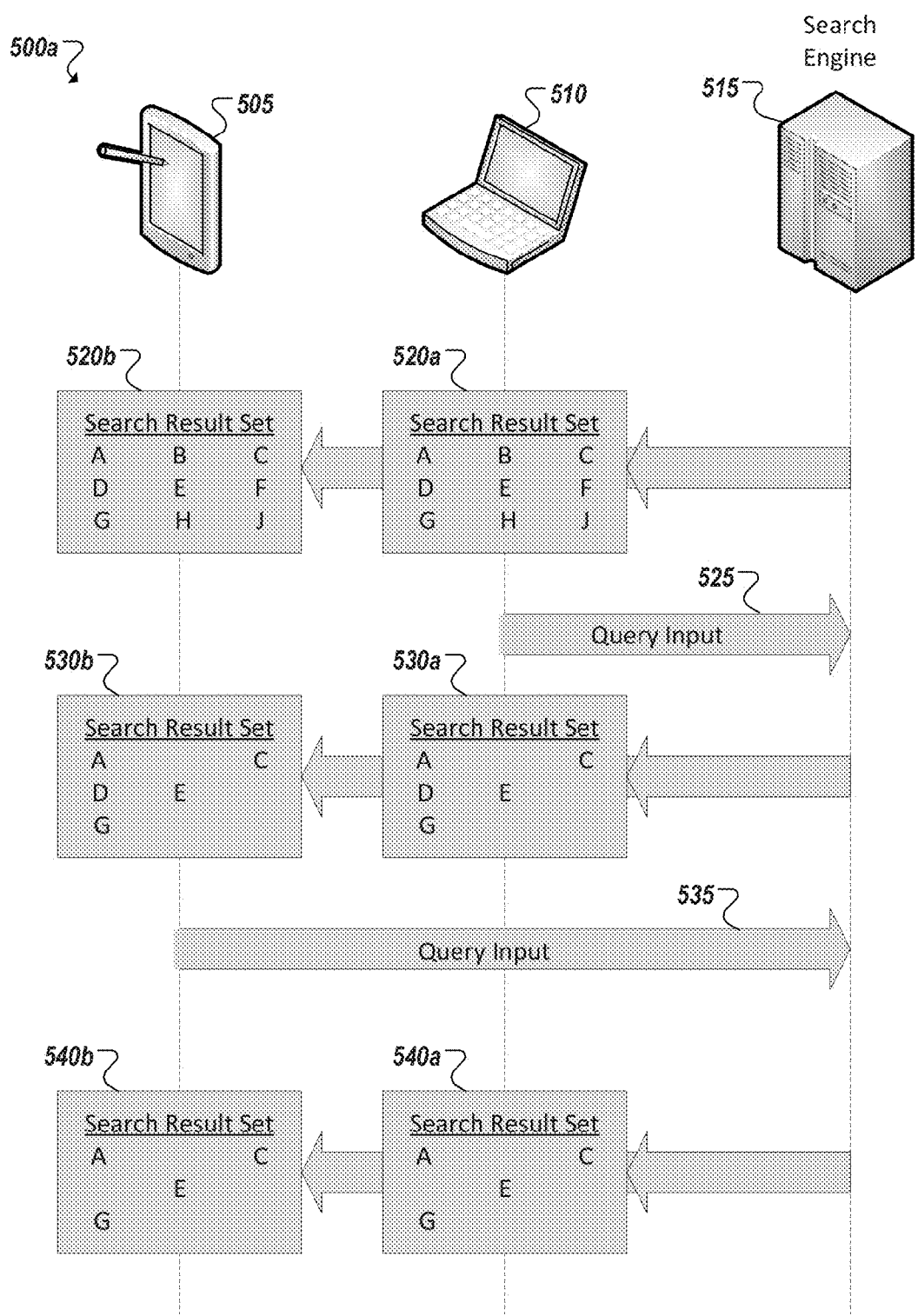
FIG. 5A-5C are simplified block diagrams illustrating example tasks in an example collaborative search in accordance with at least some embodiments.
Figure 5B:
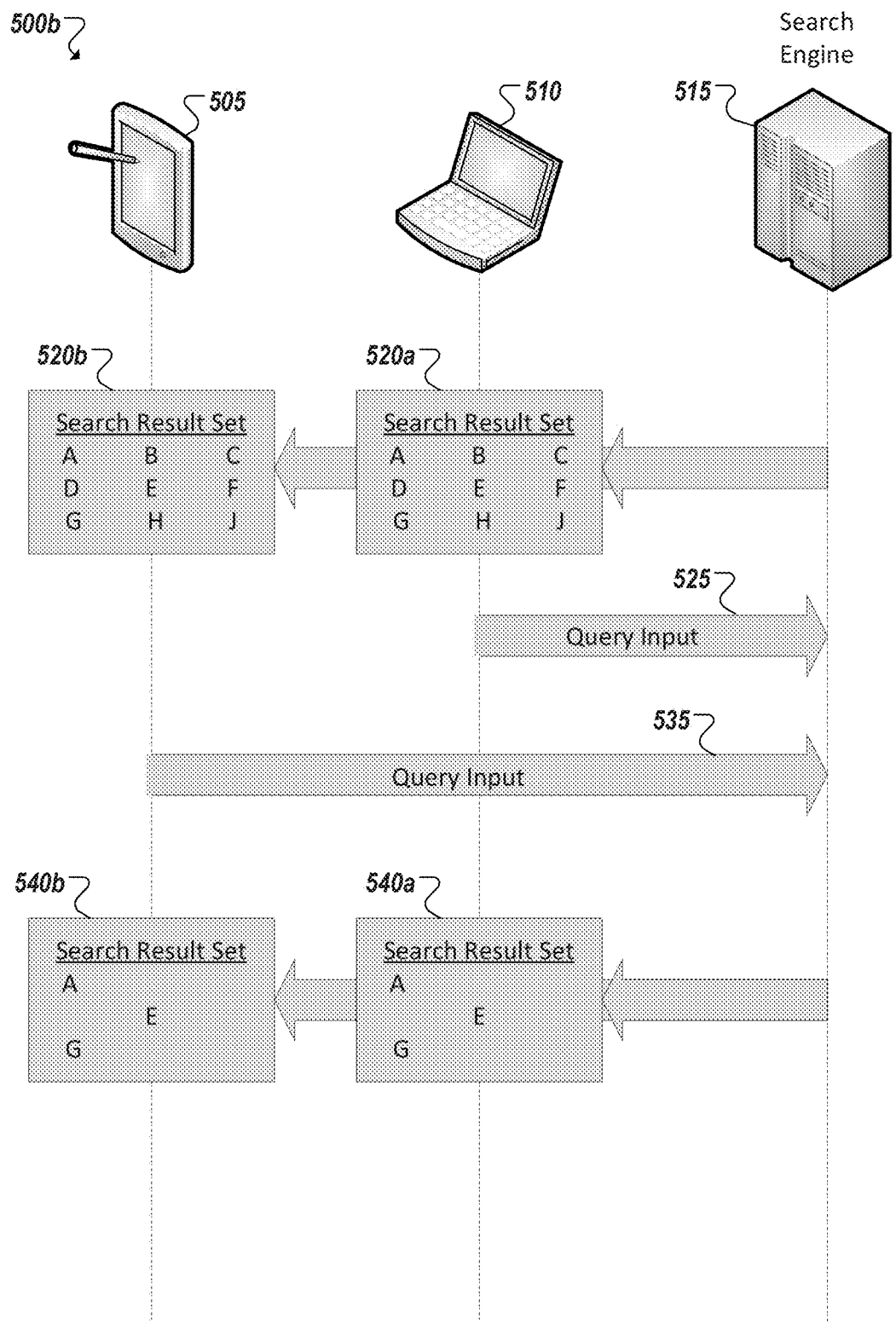
Figure 5C:
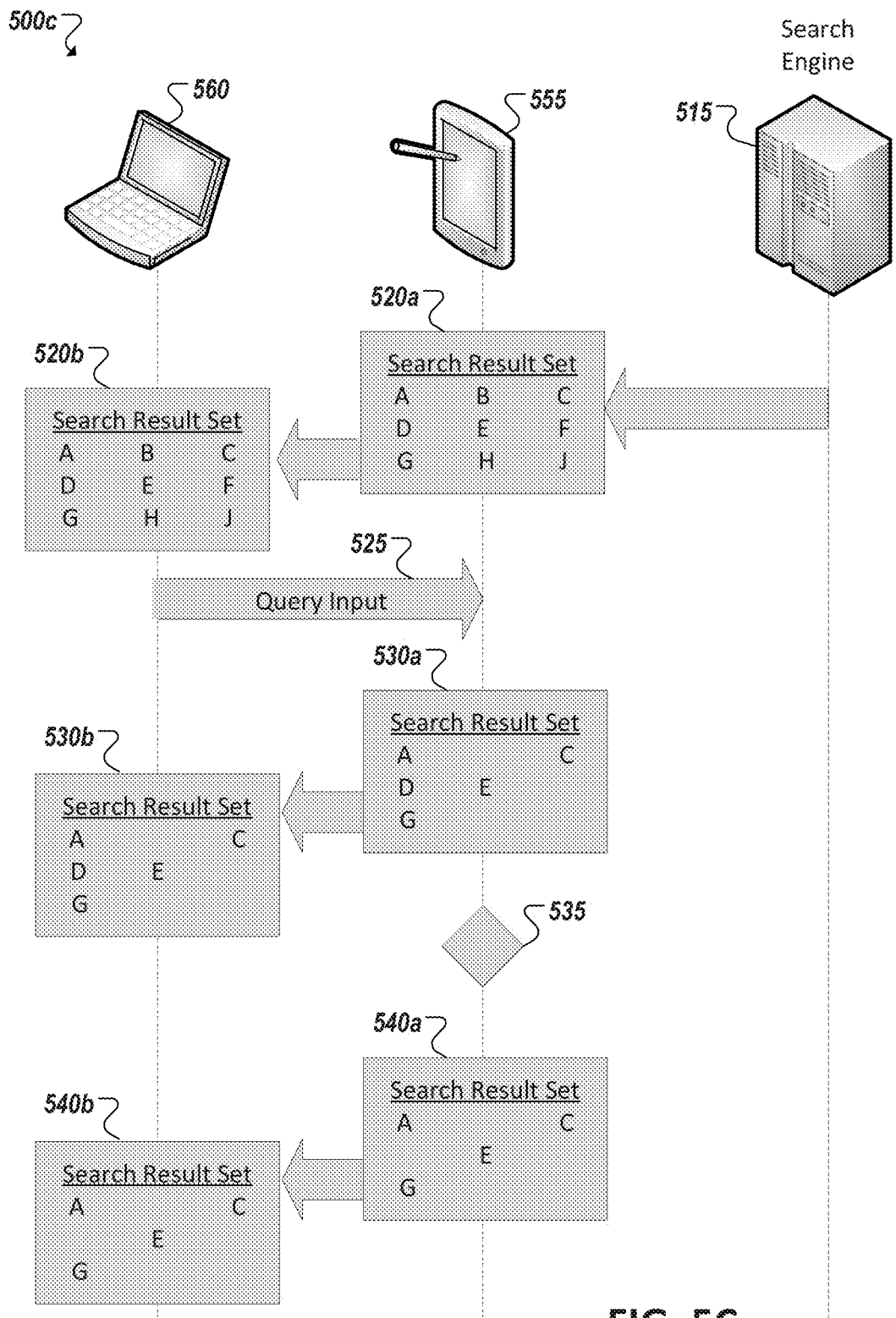

FIGS. 5A-5C illustrate additional example techniques and interactions within example collaborative search sessions. For instance, in FIG. 5A, a simplified flow diagram 500a is shown including two or more user computing devices 505, 510 interacting in a collaborative search session driven by a search engine server 515 (for instance, according to a system configuration employing principles similar to that shown and described in connection with FIG. 2B). In this particular example, each of the participating computing devices 505, 510 is provided with a set of search results 520a, 520b, either provided in response to an initial independent search session or initial collaborative query inputs (e.g., as in the example of FIG. 4). A user of computing device 510 can enter or otherwise input query data relating to the initial search results set 520a, 520b. For instance, the user of computing device 510 can add search terms to an initial query, select a search filter to further narrow the search results 520a, 520b, select one or more results included in the search results 520a, 520b, or otherwise provide inputs suggesting a modification or refining of the initial set of search results. The query input 525, in this example, can be communicated to the search engine 515 and the search engine can provide a narrowed (or in some cases, unaltered or broadened) search result set 530a, 530b based on the received query data 525. The updated search result set (or simply the updates or delta of the original search results set) can be communicated to each of the participating computing devices 505, 510 so as to prompt an updated presentation of the search results (i.e., 530a, 530b) on each of the respective participating computing devices 505, 510.

An updated or refined search result set presented on participating computing devices 505, 510 can also be analyzed, viewed, interacted with, and further refined based on inputs (e.g., 535) received from the participating computing devices 505, 510. For instance, another computing device (e.g., 505) can provide additional inputs, for instance, reflecting a user's response to the updated search result set that can also be communicated to and processed by the search engine. In response, search engine 515 can further refine and modify the set of search results to better reflect not only the original search query and earlier-received query inputs, but also the most recent query inputs. These updated search results (e.g., 540a, 540b) can also be communicated to and presented on each of the participating computing devices 505, 510.

Various algorithms can be employed to determine how each query input is to be considered during a collaborative search session. For instance, certain types of query inputs can be considered or weighted differently by a search engine in modifying a set of search results or generating a new set of search results. For instance, a query can prompt an updated search of an index of a corpus of digital resources, while other query-related inputs, such as the selection of a filter, the sorting or ranking of returned search results, serves instead to narrow or refine an already-generated set of search results. Further, query inputs from particular users can be weighted and considered differently. For instance, users can have defined roles or a hierarchy within a particular collaborative search session, allowing inputs of particular users, such as particular experts, managers, or senior collaborators to be given more weight that inputs of other users participating in the collaborative search session. Further, algorithms can also consider the search context from which a particular query input was sent, the time the query data was sent, the respective geographical locations of the query input senders, among other examples, in developing and modifying search results sets within a collaborative search session.

As noted above, in some instances, multiple query inputs received within a collaborative search session can be considered jointly in the aggregate. For instance, in the example of FIG. 5B, rather than processing each of the received query inputs 525, 535 and serially updating the search results based on each of the separate query inputs 525, 535, the received query inputs 525, 535 can be considered together, or in aggregate. Accordingly, a modified search result set 542a, 542b generated in response to a plurality of query inputs 525, 535 considered in the aggregate by the search engine 515 can be communicated to the participating computing devices 505, 510 for presentation on each of the computing devices 505, 510. In some instances, as represented in FIG. 5B, aggregating multiple query inputs rather than serially considering the same query inputs 525, 535 can yield different results (c.f., 540a, 540b and 542a, 542b).

While FIGS. 5A and 5B, illustrate a collaborative search session involving a remotely-served search engine processing each of the query inputs received during the collaborative search session, alternative implementations can localize at least a portion of the processing of query inputs. For instance, as shown in the example of FIG. 5C, a search engine server 515 can be used to obtain an initial set of search results based on a search of a large corpus of digital resources according to an initial search query, including, in some instances, a search query generated from a plurality of query inputs received in a collaborative search session. Logic for processing subsequent query inputs received within the collaborative search session can be provided through one of the participating computing devices 555, 560 (implemented, for instance, according to principles similar to those shown and described in connection with FIG. 2A), thereby allowing, among other potential advantages, to reserve more resource-intensive searching of a global corpus of resources to a dedicated search engine 515 while localizing control of collaborative searching and analysis of the pared-down set of resources (i.e., the initial search results) to the participating computing devices (e.g., 555, 560). For instance, a lead user computing device (e.g., 555) can interface with the search engine server 515 to receive an initial set of search results 520a, 520b from the search engine server 515 and distribute the results (e.g., 520b) to other participating computing devices (e.g., 560) in the collaborative search session.

Continuing with the example of FIG. 5C, the initial set of search results 520a, 520b can be presented in GUIs of the participating computing devices 555, 560. In some instances, the search results can be presented differently on different participating computing devices 555, 560, for instance, based on the respective search contexts applied at each device. As in previous examples, user query inputs can be input at one or more of the participating computing devices 555, 560, for instance, reflecting a user's interaction or response to the initial set of search results 520a, 520b. In instances where the query input (e.g., 525) is received from a participating computing device (e.g., 560) other than the lead computing device or device hosting certain collaborative search functionality in the session (e.g., device 555), the query input data 525 can be sent to the hosting participant device 555 for processing. The hosting participant device 555, in this example, can apply the received query input (e.g., 525) to the initial set of search results 520a, 520b to refine the set, thereby resulting in an updated result set 530a, 530b, that can be communicated to and presented on each of the participating computing devices 555, 560. Query inputs (e.g., 535) can also be received on the hosting participant device 555, prompting similar, corresponding refining of the search results (in this case the updated search results 530a, 535b). The further-modified search results 540a, 540b can also be communicated and presented on each of the participating computing devices 555, 560 for further analysis and consideration by users within the collaborative search session.

Figure 6:
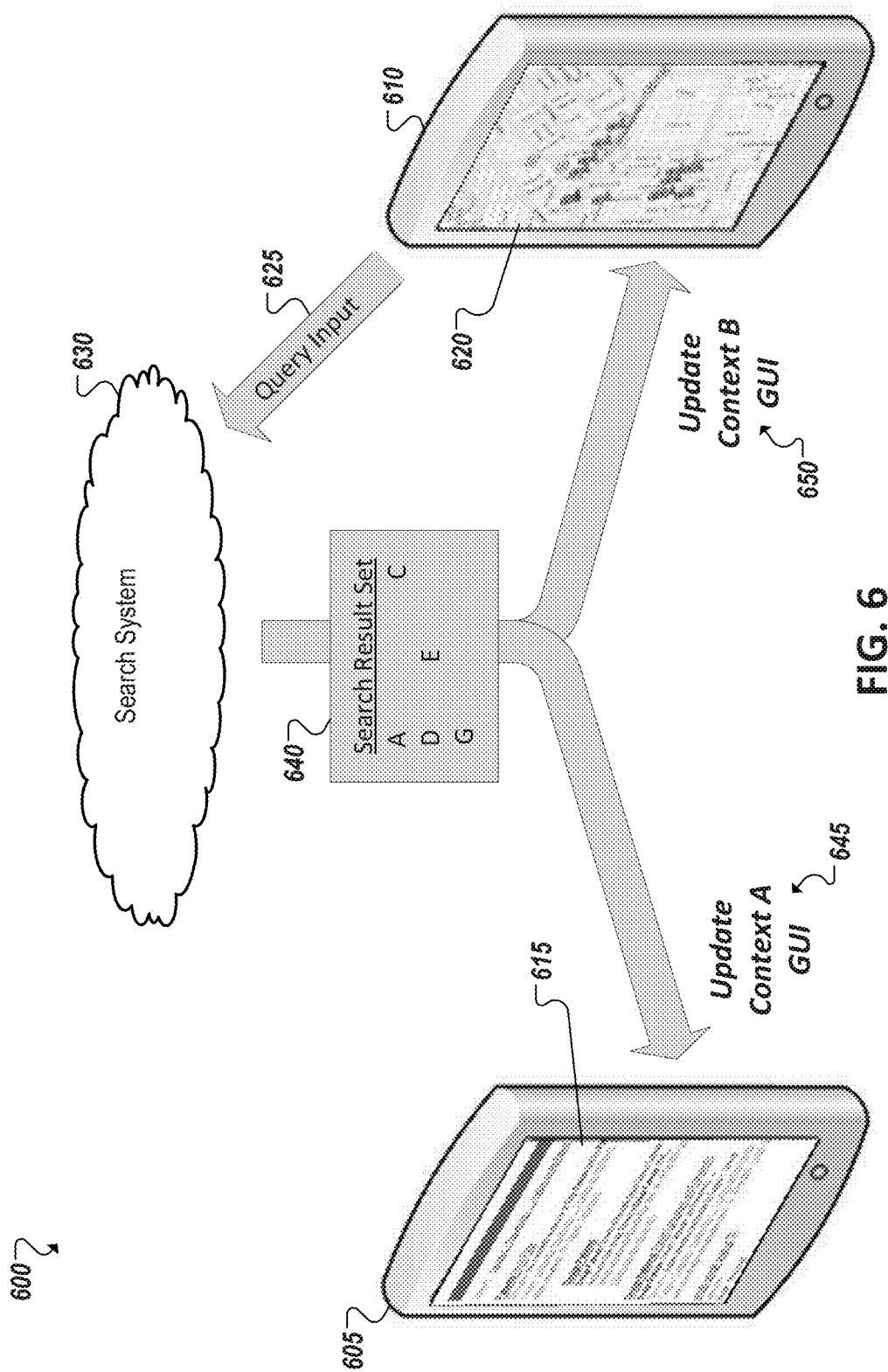
FIG. 6 is a block diagram illustrating example tasks in an example collaborative search involving multiple search interface contexts in accordance with at least some embodiments.

Turning to the example of FIG. 6, simplified block diagram 600 illustrates an example collaborative search session involving two or more computing device 605, 610 each applying a separate search context. As explained above, search contexts can include different graphical representations of search results returned from a search. Search contexts can represent search results in a variety of ways, including different infographics, varying organizational schemes, in categorized or otherwise grouped listings, as subsets of search results or search result content (such as a representation of the images, video, audio, screen captures, or other content included in resources within the set of search results), sorted or filtered in various ways, among other examples. Further, different search context GUIs and schemes can include varying interactive GUI elements allowing users to interact with the search results in different ways, in some cases, specific to the particular context. For instance, viewing search results as a listing of images or screen captures can allow a user to filter the returned results according to image size, resolution, color, etc., while other more traditional search result listings can include filters for the date of the resource, source of the reference, etc. Selection or use of such GUI elements can prompt the sending of corresponding query input data for consideration within the greater collaborative search session.

In the example of FIG. 6, a first participating device 605 within the collaborative search session presents search results within a display 615 of the device 605 according to a first context ("Context A"), such as a traditional listing of search results, including a summary of the content of each hit, its address, title, and a link to the reference. In some instances, a traditional listing of search results, such as employed in the presented context of participating device 605, can be rank-ordered according to a determined relevance of the resource to a query (e.g., determined using one or more algorithms). The other participating device 610 can present the same set of search results within the display 620 of the device according to a second context ("Context B"), such as a geographic map with flags or other indicators identifying addresses, landmarks, and other locations relevant to at least some of the hits returned in the search results.

Allowing users within a collaborative search session to concurrently assess a set of search results within different contexts can allow users within the collaborative search session to gather varying insights into the resources returned in the result set. Further, it can allow users to filter, sort, organize, and analyze the result set in different ways (i.e., according to and consistent with the varying contexts employed). Indeed, particular types of query inputs, such as particular filters, sorting, or other actions, can be context-dependent, with some types of query inputs only available through particular contexts.

Further, query input data (e.g., 625) received based on a user's interaction with a search result GUI of one context (e.g., Context B) can be communicated to a search system 630 to generate an updated set of search results 640 based on the received query input data 625. This updated search result set 640 can be communicated to each of the participating computing devices 605, 610 thereby potentially updating the presentation of the search results on each of the participating computing devices 605, 610 according to the respective search contexts applied at each computing device 605, 610. In some instances, depending on the search contexts, a change to the search results considered in the collaborative search session can affect the presentation of the search results in one context differently, or more dramatically, than the presentation of the same search results within another context. Indeed, in some instances, it is possible that the modification of search results based on particular query inputs (e.g., 625) will result in no changes to the presentation of search results in one search context while modifying the presentation of the search results in another search context employed within the collaborative search session.

To provide one particular illustrative example, a user of computing device 610 can be presented with search results reflected within a geographical map. The user can interact with the geographic map in a variety of ways including, for instance, adjusting the portion of the map that is displayed (e.g., using display 620) by dragging or panning the map to a different geographic location, zooming in, or zooming out of the original map view. In this example, a user elects to zoom-in on the displayed map representation of search results by interacting with the map via a GUI of the computing device 610. In this example, by zooming-in to the presented map view, the corresponding narrowing of the view can be interpreted to correspond to the user's narrowing interest in search results that correspond with geographic locations included in the zoomed view of the map (and the user's lack of interest in search results that correspond with search results that correspond with geographic locations outside the new, zoomed-in field of view). Accordingly, the user's interaction with the displayed map can be interpreted as a search-related input and can be communicated to a search engine as query input 625. Accordingly, the search engine can filter the original set of search results to reflect the user's zooming-in on the map to generate a modified, filtered set of search results (e.g., 640). Further, the GUI of participating device 605 can be updated to show a listing of the refined, filtered set of search results 640 based on the other participant's (e.g., 610) interaction with the previously-presented search result set. Similarly, interactions with the presented search results on participating device 605, within Context A, can cause the automatic modification of search results and lead to the display of the search result in Context B (at device 610) being automatically modified to reflect the inputs of the other user in the collaborative search session. In the particular example of FIG. 6, a modification to the search result set based on query inputs from Context A could result in such changes in a GUI of Context B as an automatic change to the map location or view displayed at device 610, the deletion or adding of new flags or markers overlaid on the map, among other examples. Users within the collaborative search session can provide numerous inputs continuously and collaboratively refining the set of search results, allowing participants within the collaborative search session to jointly develop and, in some cases, inevitably settle on a set of search results that can be individually considered, reviewed, analyzed, or otherwise used.

It should be appreciated that the examples of FIGS. 3A-6 and corresponding discussions include non-limiting examples presented merely for purposes of conveniently illustrating certain principles and features germane to the present disclosure. Other, alternate configurations, steps, components, and implementations can also be adopted without departing from the subject matter and principles of this disclosure. As an example, in some implementations, no outside search engines may need to be used, with each of the components and functionality in an example collaborative search session being included within one or more of the participating computing devices. Further, in some instances, more than one participating computing device can assume a lead role within the collaborative search session. Indeed, in some implementations, no "lead" device is designated and each of the participating computing devices possess the logic to maintain and search a shared corpus of records and refine search results according to inputs received, not only at the device from the device's user, but also from other devices controlled by other users. In such instances, participating devices could synchronize their functioning (for instance through multicast messaging within the session) so as to maintain consistent search results sets based on, and potentially modified by, a plurality of inputs received from a plurality of different devices participating in the collaborative search session, among many other examples.

It should be appreciated that the examples of FIGS. 3A-6 and corresponding discussions include non-limiting examples presented merely for purposes of conveniently illustrating certain principles and features germane to the present disclosure. Other, alternate configurations, steps, components, and implementations can also be adopted without departing from the subject matter and principles of this disclosure. As an example, in some implementations, no outside search engines may need to be used, with each of the components and functionality in an example collaborative search session being included within one or more of the participating computing devices. Further, in some instances, more than one participating computing device can assume a lead role within the collaborative search session. Indeed, in some implementations, no "lead" device is designated and each of the participating computing devices possess the logic to maintain and search a shared corpus of records and refine search results according to inputs received, not only at the device from the device's user, but also from other devices controlled by other users. In such instances, participating devices could synchronize their functioning (for instance through multicast messaging within the session) so as to maintain consistent search results sets based on, and potentially modified by, a plurality of inputs received from a plurality of different devices participating in the collaborative search session, among many other examples.

Figure 7:
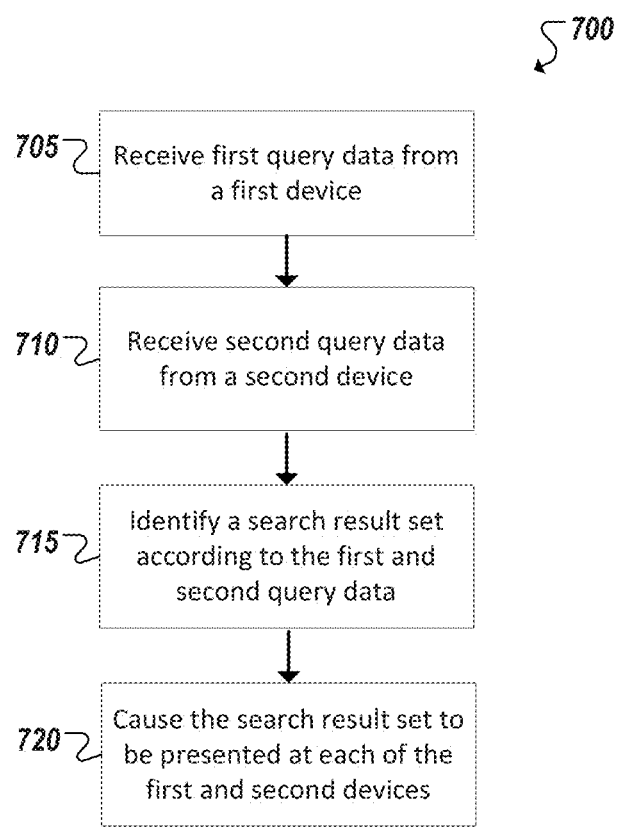
FIG. 7 is a flowchart of example techniques for collaboratively searching a corpus of digital resources in accordance with at least some embodiments.

FIG. 7 is a simplified flowchart 700 illustrating an example technique for providing a collaborative search session involving two or more participating computing devices or users. For example, query input data can be received 705 from a first computing device in a collaborative search session. Query input data can also be received 710 from another computing device participating in the collaborative search session. A set of search results can be identified 715 by a search engine based, at least in part, on the received query input data (at 705, 710). In some instances, multiple query inputs (e.g., 705, 710) can be considered together in the aggregate or serially resulting in either a single set of search results being generated based on the aggregate of the inputs or a serial set of search results being generated and modified according to the series of query inputs received from users in the collaborative search session. In either instance, the search result set can be caused 720 to be presented on each of the respective participating computing devices allowing the participants to collaborate further regarding the development of the search results returned in the collaborative search session.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options.

While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory, machine-accessible storage medium having instructions stored thereon, the instructions when executed on a machine, cause the machine to:
   receive first query data from a first computing device in a collaborative search session;
   receive second query data from a second computing device in the collaborative search session;
   cause a corpus of resources to be searched based at least in part on the first and second query data to identify a particular search result set; and
   cause at least a portion of the particular search result set to be presented on each of the first and second computing devices, wherein presentation of the portion on the first computing device is to be organized according to a first search context and presentation of the portion on the second computing device is to be organized according to a different, second search context.

2. The storage medium of claim 1, wherein the instructions, when executed, further cause the machine to develop aggregate query data from the first and second query data.

3. The storage medium of claim 1, wherein receipt of the first query data causes a first search result set to be identified based at least in part on the first query data and receipt of the second query data causes the first search result set to be modified based on the second query data to form the particular search result set.

4. The storage medium of claim 3, wherein first query data includes a search query and the first search result set is an initial search result set responsive to the search query and second query data includes a request to filter the first search result set according to a first criteria.

5. The storage medium of claim 3, wherein first query data includes a request to apply a first filter to a pre-determined search result set to form the first search result set and second query data includes a request to apply a second filter to the first search result set to form the particular search result set.

6. The storage medium of claim 1, wherein the particular search result set is an initial search result set within the collaborative search session.

7. The storage medium of claim 1, wherein the first query data is different from the second query data.

8. The storage medium of claim 1, wherein the instructions, when executed, further cause the machine to establish the collaborative search session, including associating the first and second computing devices with the particular collaborative search session.

9. The storage medium of claim 8, wherein establishing the collaborative search session includes:
   sending an invitation to join the collaborative search session to at least the second computing device, and
   identifying that the second computing device has joined the collaborative search session.

10. The storage medium of claim 8, wherein establishing the collaborative search session includes identifying that the first and second computing devices have joined the collaborative search session.

11. The storage medium of claim 1, wherein each of the first and second search contexts are selected by users at the respective first and second computing devices respectively.

12. The storage medium of claim 1, wherein at least one user input at the first computing device assigns the second search context to the second computing device.

13. The storage medium of claim 1, wherein the instructions, when executed, further cause the machine to:
   receive additional query data from the first computing device within the collaborative search session;
   revise the particular search result set based on the additional query data;
   cause the presentation on the first computing device applying the first search context to be modified in accordance with the revision of the particular search result set; and cause the presentation on the second computing device applying the second search context to be modified in accordance with the revision of the particular search result set.

14. The storage medium of claim 13, wherein the modification of the presentation on the first computing device applying the first search context is different from the modification of the presentation on the second computing device applying the second search context.

15. The storage medium of claim 1, wherein the instructions, when executed, further cause the machine to close the collaborative search session by at least one of saving the collaborative search session and tearing down the collaborative search session.

16. The storage medium of claim 1, wherein the collaborative search session is hosted, at least in part, by the first computing device.

17. The storage medium of claim 1, wherein the collaborative search session is hosted by a remote search server.

18. The storage medium of claim 1, wherein query data includes at least one of a search query, additional search query term, a filter to be applied to a set of search results, a request to sort a set of search results, inputs from a query branching by one of the devices participating in the collaborative search session, an interaction with a presentation of a set of search results, and feedback data relating to one or more results returned in a set of search results.

19. A method comprising:
receiving first query data from a first computing device in a collaborative search session;
receiving second query data from a second computing device in the collaborative search session;
causing a corpus of resources to be searched based at least in part on the first and second query data to identify a particular search result set; and
causing at least a portion of the particular search result set to be presented on each of the first and second computing devices, wherein presentation of the portion on the first computing device is to be organized according to a first search context and presentation of the portion on the second computing device is to be organized according to a different, second search context.

20. A system comprising:
a memory configured to store data;
a processor operable to execute instructions associated with the data; and
a collaborative search tool, adapted when executed by the at least one processor device to:
receive first query data from a first computing device in a collaborative search session;
receive second query data from a second computing device in the collaborative search session;
cause a corpus of resources to be searched using the first and second query data to identify a particular search result set; and
cause at least a portion of the particular search result set to be presented on each of the first and second computing devices, wherein presentation of the portion on the first computing device is to be organized according to a first search context and presentation of the portion on the second computing device is to be organized according to a different, second search context.

21. The system of claim 20, wherein the first computing device comprises the collaborative search tool.

22. The system of claim 20, wherein a server remote from the first and second computing devices comprises the collaborative search tool.

23. The system of claim 22, wherein the server further comprises a search engine adapted to search the corpus of resources to identify resources satisfying particular search queries.

24. The storage medium of claim 1, wherein the first search context defines a first organization of at least the portion of the particular search result set in the presentation of the portion on the first computing device and the second search context defines a different, second organization of at least the portion of the particular search result set in the presentation of the portion on the second computing device.

25. At least one non-transitory, machine-accessible storage medium having instructions stored thereon, the instructions when executed on a machine, cause the machine to:
identify a search result set based at least in part on particular search query data, wherein at least a portion of the particular search result set is presented on each of a first computing device and a second computing device in a collaborative search session, wherein presentation of the portion on the first computing device is organized according to a first search context and presentation of the portion on the second computing device is organized according to a different, second search context;
receive additional query data from the first computing device within the collaborative search session;
revise the search result set based on the additional query data;
cause the presentation on the first computing device applying the first search context to be modified in accordance with the revision of the particular search result set; and
cause the presentation on the second computing device applying the second search context to be modified in accordance with the revision of the particular search result set.

* * * * *